United States Patent
Yokogawa

(10) Patent No.: US 8,416,370 B2
(45) Date of Patent: Apr. 9, 2013

(54) LIQUID CRYSTAL DISPLAY DEVICE HAVING PATTERNED ALIGNMENT FIDUCIAL MARK AND METHOD FOR MANUFACTURING THE SAME

(75) Inventor: Akira Yokogawa, Ishikawa-ken (JP)

(73) Assignee: Japan Display Central Inc., Fukaya-shi (JP)

( * ) Notice: Subject to any disclaimer, the term of this patent is extended or adjusted under 35 U.S.C. 154(b) by 532 days.

(21) Appl. No.: 12/626,780

(22) Filed: Nov. 27, 2009

(65) Prior Publication Data

US 2010/0271572 A1 Oct. 28, 2010

(30) Foreign Application Priority Data

Apr. 22, 2009 (JP) ................. 2009-104127

(51) Int. Cl.
*G02F 1/1335* (2006.01)
*G02F 1/1333* (2006.01)
*G02F 1/1345* (2006.01)
*G02F 1/1337* (2006.01)

(52) U.S. Cl. ........... 349/96; 349/110; 349/152; 349/191

(58) Field of Classification Search ............ 349/96, 349/110, 152, 191
See application file for complete search history.

(56) References Cited

U.S. PATENT DOCUMENTS

| 7,317,281 | B2 * | 1/2008 | Hayashi et al. | 313/512 |
| 7,808,608 | B2 * | 10/2010 | Park et al. | 349/191 |
| 2006/0290874 | A1 | 12/2006 | Yoon et al. | |
| 2010/0079694 | A1 * | 4/2010 | Yoshida et al. | 349/40 |
| 2010/0214524 | A1 * | 8/2010 | Yanagawa et al. | 349/156 |

FOREIGN PATENT DOCUMENTS

| JP | 2005-266284 | 9/2005 |
| JP | 2007-121688 | 5/2007 |

OTHER PUBLICATIONS

U.S. Appl. No. 13/015,143, filed Jan. 27, 2011, Yokogawa.

* cited by examiner

*Primary Examiner* — Huyen Ngo
(74) *Attorney, Agent, or Firm* — Oblon, Spivak, McClelland, Maier & Neustadt, L.L.P.

(57) ABSTRACT

A liquid crystal display device includes a polarizer plate attached to at least one of outer surfaces opposed to the inner surfaces of a counter substrate and an array substrate between which a liquid crystal layer is interposed. Active areas are formed on the respective array and counter substrates to form a pixel matrix. A shield element surrounds the active area on the counter substrate and extends to a corner portion of the counter substrate where a polarizer plate fiducial mark is formed to check alignment error of the polarizer plate attached to each of the respective outer surfaces of the array substrate and the counter substrate, the fiducial mark formed by patterning of the material of the shield layer to produce a pattern defined by retained portions of the material of the shield layer and aperture portions where the material of the shield layer has been removed.

8 Claims, 7 Drawing Sheets

LIQUID CRYSTAL DISPLAY DEVICE HAVING PATTERNED ALIGNMENT FIDUCIAL MARK AND METHOD FOR MANUFACTURING THE SAME

CROSS-REFERENCE TO RELATED APPLICATION

This application is based upon and claims the benefit of priority from prior Japanese Patent Application No. 2009-104127, filed Apr. 22, 2009, and the entire contents of which are incorporated herein by reference.

BACKGROUND OF THE INVENTION

1. Field of the Invention

The present invention relates to a liquid crystal display device, and more particularly, to a liquid crystal display device capable of easily identifying alignment errors of a polarizer plate attached to a LCD substrate, and a manufacturing method thereof.

2. Description of the Background Art

Liquid crystal display devices have been widely used as display devices for OA equipment such as personal computers or word processors and audiovisual equipment such as TV sets, video movies, and car navigations because the display devices have many advantages such as lightness, compactness and low power consumption.

In a process to manufacture the liquid crystal display device, predetermined alignment marks are used as an alignment tool to form various patterns, to cut a plurality of liquid crystal display panels from a LCD mother substrate and to attach films or plates such as polarizer plates the liquid crystal display device.

For example, Japanese laid open patent application No. 2007-121688 discloses a technique to form alignment marks at corners of a mother substrate. Under this technique, alignment marks are discarded after cutting the mother substrate into unit substrates. In this technique, the alignment mark is crossed shape and formed simultaneously with a black matrix using the same material as the black matrix in a case where the alignment mark is formed on a color filter side substrate. On the other hand, Japanese laid open patent application No. 2005-266284 discloses a technique to display an alignment mark to attach a polarizer plate at inside of a display area so as to overlap with an alignment mark formed on the polarizer plate. Further, the Japanese laid open patent application discloses an alignment mark formed outside of the display area in the liquid crystal display panel in advance.

BRIEF SUMMARY OF THE INVENTION

The present invention has been made to address the above mentioned alignment mark or fiducial mark. One object of this invention is to provide a liquid crystal display device capable of easily inspecting alignment error of a polarizer plate attached to the liquid crystal display panel.

Thus, according to one aspect of the invention, there is provided a liquid crystal display device including: an array substrate and a counter substrate facing each other and including a liquid crystal layer interposed between inner surfaces of the array substrate and the counter substrate; at least one of polarizer plates attached to respective outer surfaces opposed to the inner surfaces of the counter substrate and the array substrate; an active area formed on the array substrate and the counter substrate to form a plurality of pixels in a matrix; a common voltage supply pad formed at a corner of the array substrate; a common voltage supply region formed on the counter substrate to supply the common voltage to a counter electrode; a conductive element to connect the common voltage supply pad on the array substrate with the counter electrode extending to the common voltage supply region facing the common voltage supply pad; a shield layer formed on the counter substrate to surround the active area and extending to the common voltage supply region facing the common voltage supply pad; a polarizer plate fiducial mark including a first mark formed of the same material as the shield layer and a second mark formed of an aperture pattern in the shield layer on the counter substrate to check alignment error of the attached polarizer plate with at least one of the outer surfaces of the array substrate and the counter substrate.

According to another aspect of the invention, there is provided a liquid crystal display device including: an array substrate and a counter substrate facing each other and including a liquid crystal layer interposed between inner surfaces of the array substrate and the counter substrate; at least one of polarizer plates attached to respective outer surfaces opposed to the inner surfaces of the counter substrate and the array substrate; an active area formed on the array substrate and the counter substrate to form a plurality of pixels in a matrix: a common voltage supply pad formed at a corner of the array substrate; a common voltage supply region formed on the counter substrate to supply the common voltage to a counter electrode; a conductive element to connect the common voltage supply pad on the array substrate with the counter electrode extending to the common voltage supply region; a common voltage supply layer extending to the common voltage supply pad on the array substrate to supply the common voltage to the counter electrode formed on the counter substrate through the conductive element; a polarizer plate fiducial mark arranged at an end portion in the extended common voltage layer to the common voltage supply pad including a first mark formed of the same material as the common voltage supply layer and a second mark formed of an aperture pattern made in the common voltage supply layer to check alignment error of the attached polarizer plate with at least one of the outer surfaces of the array substrate and the counter substrate.

According to further another aspect of the invention, there is provide a method for manufacturing a liquid crystal display device including: providing an array substrate and a counter substrate facing each other and including a liquid crystal layer interposed between inner surfaces of the array substrate and the counter substrate; attaching a polarizer plate to at least one of respective outer surfaces opposed to the inner surfaces of the counter substrate and the array substrate; forming an active area on the array substrate and the counter substrate to form a plurality of pixels in a matrix by a shield element, the shield element being formed to surround the active area on the counter substrate and extending to a corner portion of the counter substrate; forming a polarizer plate fiducial mark arranged on the counter substrate and including a first mark formed of the same material as the shield layer and a second mark formed of an aperture pattern made in the shield layer to check alignment element of the attached polarizer plate with at least one of the outer surfaces of the array substrate and the counter substrate.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
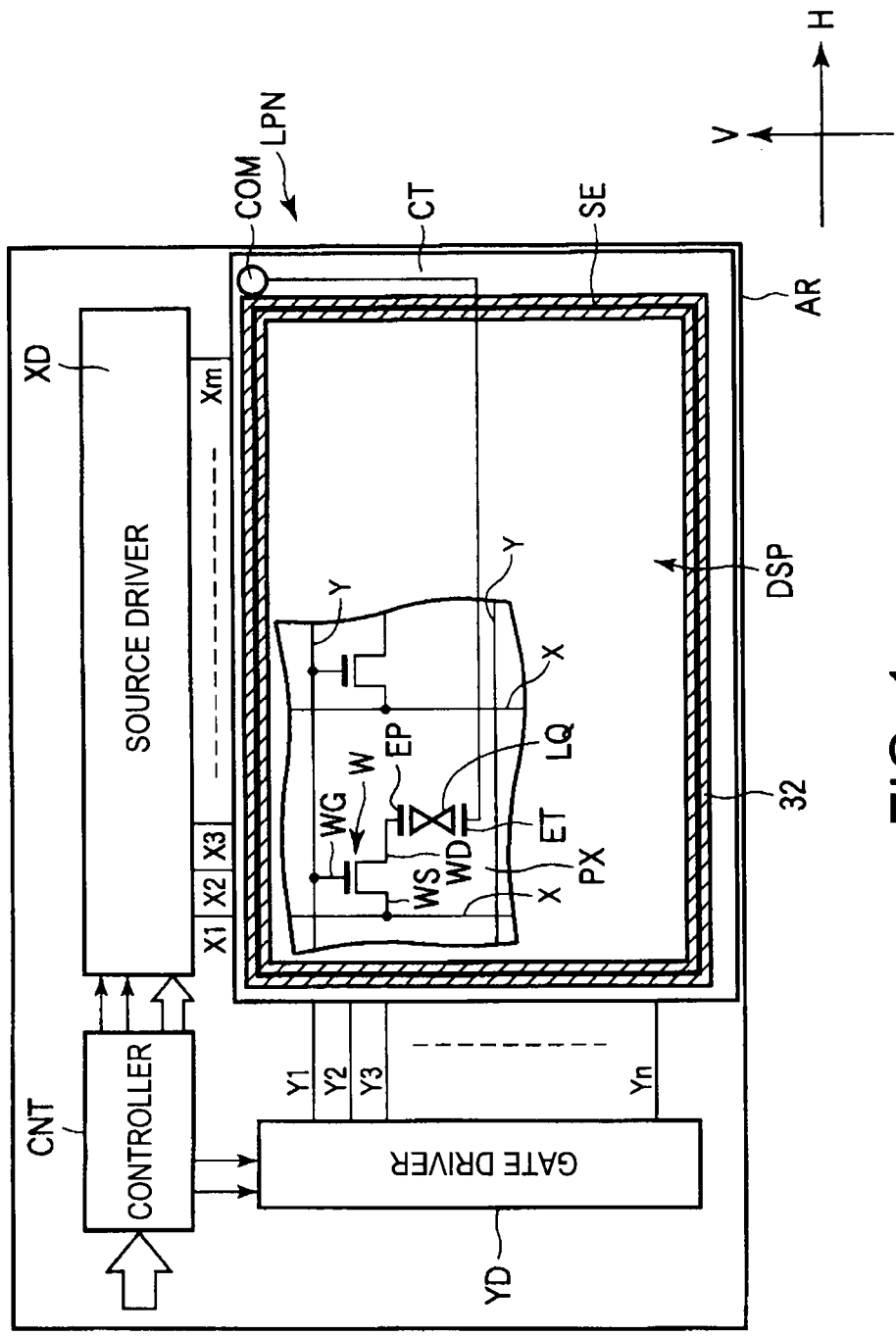
FIG. 1 is a block diagram showing a liquid crystal display device according to a first embodiment of the present invention.

A liquid crystal display device having a polarizer plate according to an exemplary embodiment of the present invention, in particular, a polarizer plate fiducial mark formed on a liquid crystal display panel will now be described with reference to the accompanying drawings wherein the same or like reference numerals designate the same or corresponding parts throughout the several views.

FIG. 1 is a block diagram showing a liquid crystal display device according to a first embodiment of the present invention.

The liquid crystal display device is an active matrix type (AMLCD) and includes a liquid crystal display panel LPN. The liquid crystal display panel LPN includes a pair of substrates, that is, an array substrate AR as a first substrate and a counter substrate CT as a second substrate arranged so as to face each other. The array substrate AR and the counter substrate CT are attached by a seal element SE. The liquid crystal display panel LPN includes a liquid crystal layer LQ interposed between the array substrate AR and the counter substrate CT. The liquid crystal display panel LPN also includes a display area to display images, that is, an active area DSP. The active area DSP is formed of a plurality of pixels arranged in a matrix of (m×n) and surrounded by the seal element SE.

The array substrate AR includes n gate lines (Y1~Yn) arranged in a first direction (row direction), m source lines (X1~Xm) arranged in a second direction (column direction) crossing with the first direction, (m×n) switching elements W and (m×n) pixel electrodes EP in the active area DSP. The switching element W is, for example, formed of n-channel type thin film transistor (TFT). A gate electrode WG of the switching element W is connected to the gate line Y or formed integrally with the gate line Y. A source electrode WS of the switching element W is electrically connected to the source line X or formed integrally with the source lines X. A drain electrode WD of the switching element W is electrically connected to the pixel electrode EP. The respective n gate lines Y (Y1~Yn) are retrieved to outside of the active area DSP and connected to a gate driver YD. The gate driver YD supplies scan signals (driving signals) to n gate lines Y (Y1~Yn) controlled by a controller CNT.

The respective m source lines X (X1~Xm) are also retrieved to outside of the active area DSP and connected to the source driver XD. The source driver XD supplies scan signals (driving signals) to the respective m source lines X (X1~Xm) controlled by the controller CNT.

On the other hand, the counter substrate CT includes a counter electrode ET in the active area DSP. The counter electrode ET is used in common for the plurality of pixels PX. That is, the counter electrode ET faces the pixel electrodes EP of the respective pixels PX and common voltage COM is supplied to the counter electrode ET at outside of the active area DSP. The counter substrate CT includes a shield layer 32 surrounding the active area DSP. The shield area 32 is arranged in a frame shape.

Figure 2:
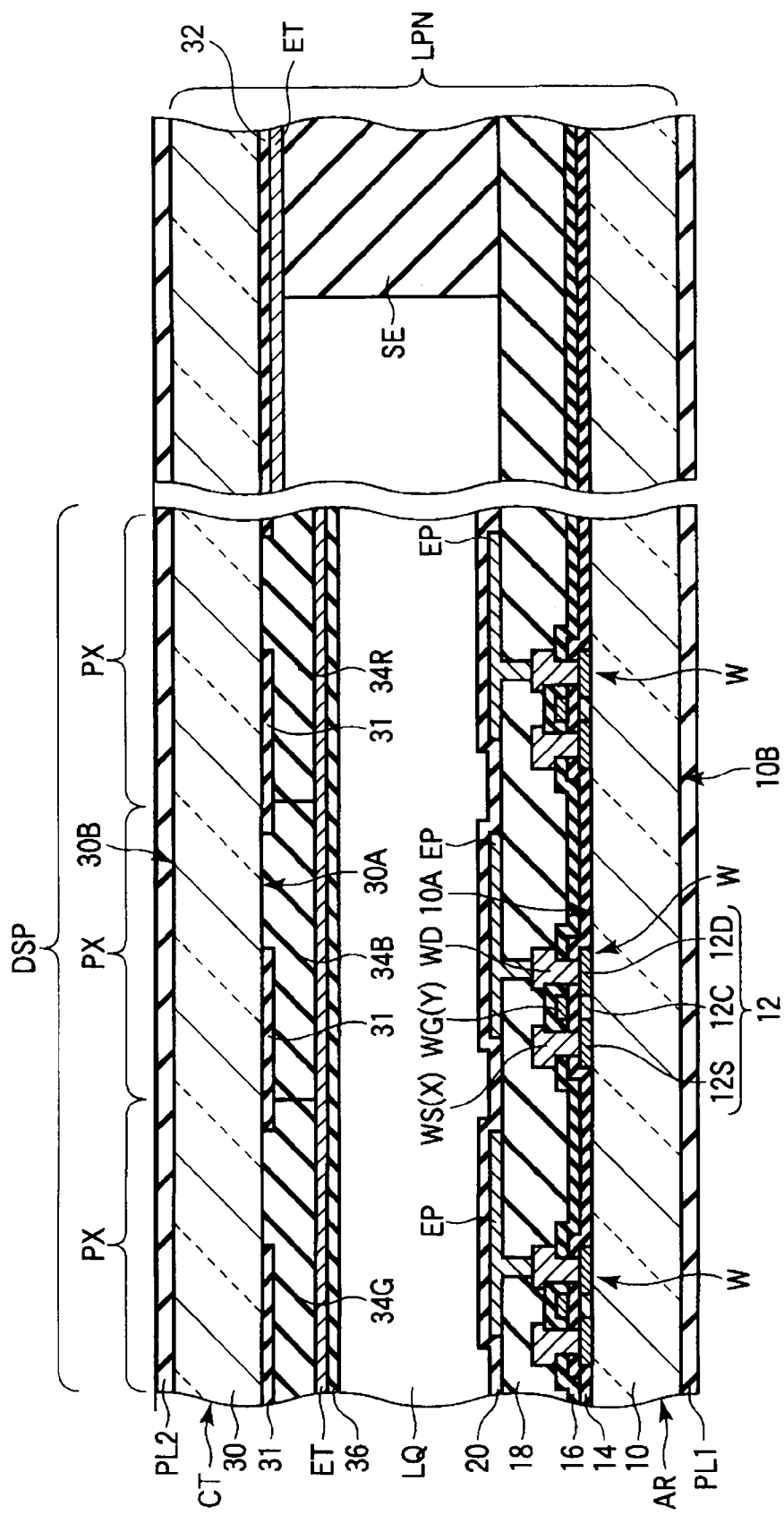
FIG. 2 is a schematic cross-sectional view showing a structure of the first embodiment according to the present invention.

Herein, the detailed construction of the liquid crystal display panel LPN will be described. FIG. 2 is a schematic cross-sectional view showing a structure of the first embodiment according to the present invention. The array substrate AR of the liquid crystal display panel LPN is formed of a transmissive insulating substrate 10 such as a glass substrate or a quartz substrate. The array substrate AR includes the switching elements W and the pixel electrodes EP on a surface 10A of the insulating substrate 10, which faces the counter substrate CT.

The switching element W includes a semiconductor layer 12 formed on the insulating substrate 10. The semiconductor layer 12 may be formed of amorphous or poly-silicon. In this embodiment, poly-silicon is used as the semiconductor layer 12. The semiconductor layer 12 includes a source region 12S and a drain region 12D interposing a channel region 12C therebetween. The semiconductor layer 12 is covered with a gate insulating layer 14. The gate electrode WG of the switching element W is arranged on the gate insulating layer 14 and also positioned on the channel region 12C. The gate electrode WG is integrally formed with the gate line Y formed on the channel region 12C in this embodiment. The gate line Y and the gate electrode WG may be formed using the same process and the same material, for example, a conductive material with low resistivity such as aluminum, molybdenum, tungsten or titanium.

The gate electrodes WG of the switching elements W and the gate lines Y are covered with an interlayer insulation film 16. The interlayer insulation film 16 is also arranged on the gate insulating layer 14. The gate insulating layer 14 is formed of organic material such as silicon oxide or silicon nitride. The source electrodes WS of the switching elements W are arranged on the interlayer insulation film 16. The source electrodes WS are integrally formed with the source lines X arranged on the interlayer insulation film 16. The source electrode WS contacts with the source region 12S of the semiconductor layer 12 through a contact hole which penetrates the gate insulating layer 14 and the interlayer insulation film 16.

The drain electrode WD of the switching element W is arranged on the interlayer insulation film 16. The drain electrode WD contacts with the drain region 12D of the semiconductor layer 12 through a contact hole which penetrates the gate insulating layer 14 and the interlayer insulation film 16. The source line X and the source electrode WS may be formed using the same process and the same material, for example, a conductive material with low resistivity such as aluminum, molybdenum, tungsten or titanium may be used to also form source lines X and source electrode WS.

The source lines X, source electrodes WS and drain electrodes WD are covered with an insulating layer 18. The insulating layer 18 formed of transmissive organic resin material is arranged on the interlayer insulation film 16. The insulating layer 18 is formed by cure treatment after coating a resin layer using a spin coat method. The insulating layer 18 flattens the irregular surface of a lower layer. Therefore, the surface of the lower layer facing the liquid crystal layer LQ is substantially flattened.

The pixel electrode EP is arranged in each pixel in the active area DSP. That is, the pixel electrode EP is arranged on the insulating layer 18 and connected with the drain electrode WD through a contact hole formed in the insulating layer 18. The pixel electrode EP is formed of a transmissive conductive material such as Indium Tin Oxide (ITO) or Indium Zinc Oxide (IZO).

The surface of the array substrate AR facing the counter substrate CT, that is, a surface which contacts with the liquid crystal layer LQ is covered with a first alignment film 20. On the other hand, the counter substrate CT of the liquid crystal display panel LPN is formed of a transmissive insulating substrate 30 such as a glass plate or a quart glass. The counter substrate CT includes a black matrix 31, a color filter layer 34 (R, G, B) and a counter electrode ET formed on the color filter layer 34 (R, G, B) facing the array substrate AR.

The black matrix 31 is arranged between the pixels PX in the active area DSP. The black matrix 31 may be formed of black colored resin or metal with light blocking characteristics such as chrome (Cr). The black matrix 31 is arranged on the insulating substrate 30 and faces the switching element W and various wiring layers such as the above-mentioned gate lines Y or source lines X. The shield layer 32 is arranged outside of the active area DSP. The shield layer 32 may be formed of the same material as the black matrix 31. Accordingly, the black matrix 31 and the shield layer 32 are manufactured by simultaneously using the same process without increasing the number of manufacturing steps. The color filter layer 34 (R, G, B) is arranged on the respective pixels in the active area DSP. The color filter layer 34 (R, G, B) is arranged on the insulating substrate 30 and a portion of the color filter layer 34 (R, G, B) is stacked on the black matrix 31.

The color filter layer 34 (R, G, B) is formed of a plurality of different colored resins, for example, three colored red, green and blue resins. The color filter layer 34 R is formed of a red colored resin and arranged on a pixel to display red color. The color filter layer 34 G is formed of the green colored resin and arranged on a pixel to display green color. The color filter layer 34 B is formed of a blue colored resin and arranged on a pixel to display blue color.

The counter electrode ET is arranged in the active area DSP and entirely covers the color filter layer 34 (R. G. B). The counter electrode ET faces the pixel electrodes EP of pixels in the active area DSP. The counter electrode ET is formed of transmissive conductive material such as ITO or IZO. A transmissive overcoat layer may be formed between the color filter layer 34 (R, G, B) and the counter substrate CT to planarize of the surface of the color filter layers 34 (R, G, B). The surface of the counter substrate CT which faces the array substrate AR, that is, the surface which contacts with the liquid crystal layer LQ is covered with a second alignment film 36. The first and second alignment films 20 and 36 are, for example, formed of polyimide.

The array substrate AR and the counter substrate CT are arranged so that the first alignment film 20 and the second alignment film 36 face each other. A columnar spacer (not shown) made by resin is integrally formed on one of the substrates, and a predetermined cell gap between the array substrate AR and the counter substrate CT is formed. The array substrate AR and the counter substrate CT are attached by a seal element SE keeping the cell gap. The liquid crystal layer LQ is formed in the cell gap. The liquid crystal layer LQ is formed of liquid crystal material held between the pixel electrode EP of the array substrate AR and the counter electrode ET of the counter substrate CT. The first alignment film 20 is interposed between the liquid crystal layer LQ and the pixel electrode EP. Similarly, the second alignment film 36 is interposed between the liquid crystal layer LQ and counter electrode ET.

A first polarizer plate PL1 is attached on an outside surface, that is, a second surface 10B opposed to the first surface 10A of the insulating substrate 10 which forms the array substrate AR by an adhesion bond using an alignment equipment. On the other hand, a second polarizer plate PL2 is attached to a second surface 30B opposed to a first surface 30A of the insulating substrate 30 which forms the counter substrate CT by an adhesion bond using an alignment equipment. The first polarizer plate PL1 and the second polarizer plate PL2 extend to outside of the active area DSP.

Figure 3:
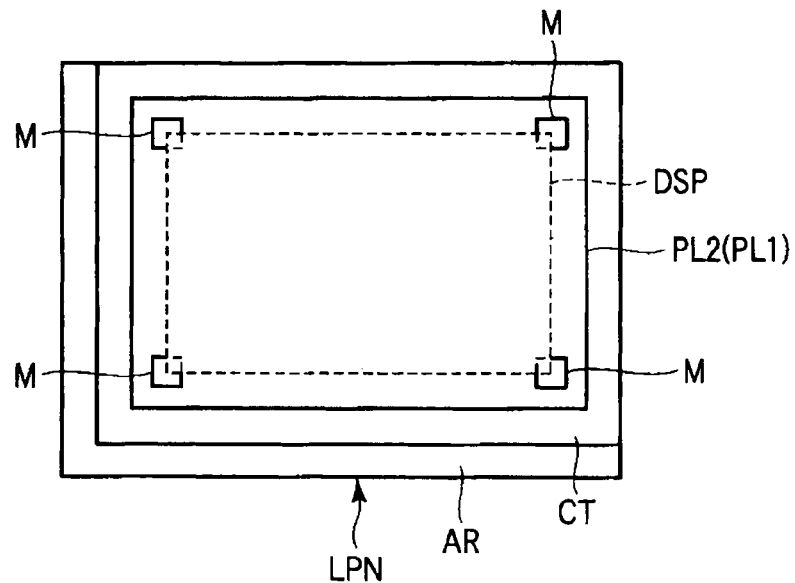
FIG. 3 is a schematic plan view showing a liquid crystal display panel viewed from a counter substrate side shown in FIG. 2, according to the first embodiment of the present invention.

FIG. 3 is a schematic plan view showing a liquid crystal display panel LPN viewed from the counter substrate side CT shown in FIG. 2 according to the first embodiment of the present invention.

After the alignment of the first polarizer plate PL1 and the second polarizer plate PL2 with the array substrate AR and the counter substrate CT, it is necessary to check the alignment error of the attached first and second polarizer plates PL1 and PL2. In this embodiment, a polarizer plate fiducial mark is used to check the alignment error. Four polarizer plate fiducial marks M are arranged outside of the active area DSP on a surface of the counter substrate CT. The four polarizer plate fiducial marks M are arranged at each of the four corners of the counter substrate CT. In FIG. 3, though only the second polarizer plate PL2 is shown in the outside surface of the counter substrate CT, the first polarizing plate PL1 which is in the same size as the second polarizer plate LP2 is attached on the array substrate AR opposing to the second polarizer plate LP2. The first polarizer plate PL1 and the second polarizer plate PL2 are formed in a rectangular shape and arranged on the active area DSP extending to outside of the active area DSP.

The first polarizing plate PL1 is aligned with the second polarizing plate PL2 by aligning the respective four corners with the four polarizing marks M formed on the counter substrate CT of the liquid crystal display panel LPN.

Practically, the check of the alignment error of the first and second polarizer plates PL1 and PL2 with the array substrate AR and the counter substrate CT is made with eyes. Accordingly, misalignment between an upper and a lower of the respective first and second polarizer plates PL1 and PL2 and between left and right of the respective first and second polarizer plates PL1 and PL2, and misalignment in a rotation direction of the respective first and second polarizer plates PL1 and PL2 in a liquid crystal display panel LPN in a plane are easily checked. The attachment accuracy of the first and second polarizer plates PL1 and PL2 is also raised.

Figure 4:
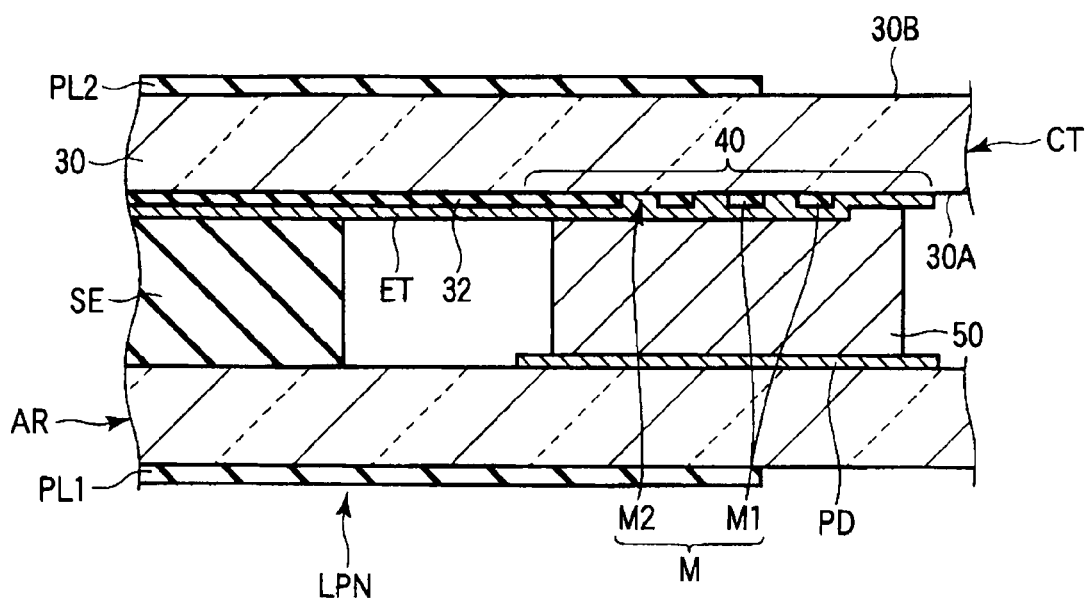
FIG. 4 is a schematic cross-sectional view showing a power supply structure to supply power from an array substrate to the counter substrate.

FIG. 4 is a schematic cross-sectional view showing a power supply structure to supply power from the array substrate AR to the counter substrate CT. The array substrate AR includes a power supply pad PD arranged outside of the active area DSP. Common voltage is supplied to the power supply pad PD. The power supply pad PD is arranged outside of the seal element SE and may be formed of various conductive materials which are used to form the gate lines Y, the source lines X or the pixel electrodes EP shown in FIG. 2.

In the counter substrate CT, the shield layer 32 formed on the first surface 30A of the insulating substrate 30 extends to outside of the active area DSP beyond the shield element SE. The shield element 32 extends to a power supply region 40 which faces the power supply pad PD on the array substrate AR. The counter electrode ET arranged on the shield layer 32 also extends to outside of the active area DSP beyond the shield element SE. That is, the counter electrode ET of the counter substrate CT covers the shield layer 32.

A conductive element 50 is interposed between the power supply pad PD formed on the array substrate AR and the counter electrode ET extending to the power supply region 40 in the counter substrate CT and electrically connects the power supply pad PD to the counter electrode ET. According to the above power supply construction, it become possible to suppress a disconnection of the counter electrode ET due to a step caused by the insulating substrate 30 and the shield layer 32 between the active area DSP and the power supply region 40 by extending the shield layer 32 to the power supply region 40. Thereby, it becomes possible to reliably supply the common voltage to the counter electrode ET.

The above power supply construction may be formed at the four corners in the liquid crystal display panel LPN. In this case, if the polarizer plate fiducial mark M overlaps with the power supply region 40, particularly, if the polarizer plate fiducial mark M overlaps with the shield layer 32, it becomes difficult to visually check the polarizer plate fiducial mark M with eyes. Therefore, reliable alignment check of the attached first and second polarizing plates PL1 and PL2 may not be achieved.

In this embodiment, the polarizer plate fiducial mark M that overlaps with the power supply region 40 is arranged on the first surface 30A of the insulating substrate 30. The polarizer plate fiducial mark M is formed by patterning the shield layer 32. The polarizer plate fiducial mark M includes first mark M1 formed of the same material as the shield layer 32 extending to the power supply region 40 and a second mark M2 formed of apertures made in the shield layer 32. The polarizer plate fiducial mark M is simultaneously formed in the patterning process of the shield layer 32. The first mark M1 is formed on the first surface 30A in an island shape by patterning the shield layer 32. Since the first mark M1 is formed of the same material as the shield layer 32, for example, chromium (Cr), light does not transmit or hardly transmit. It is desirable to make distance between the first mark M1 and the shield layer 32 so that the first mark M1 is visually distinguished from the shield layer 32.

The second mark M2 is formed of apertures in the shield layer 32. The second mark M2 is formed by selectively removing the shield layer 32 and the apertures penetrate to the first surface 30A of the insulating substrate 30 which forms the counter substrate CT. Therefore, light passes through the second mark M2. It is desirable to set a dimension of the aperture of the second mark M2 in a manner that allows the second mark M2 to be viewed with eyes in the shield layer 32. When we check the polarizer plate fiducial mark M with eyes, for example, the first mark M1 is recognized as a pattern with a low transmission factor or a colored pattern. On the other hand, the second mark M2 is recognized as a pattern with a high transmission factor or a non-colored pattern. Therefore, even if the polarizer plate fiducial mark M overlaps with the power supply region 40, it becomes easier to check the first mark M1 with eyes. Consequently, it becomes possible to easily check the alignment error of the attached first and second polarizer plates PL1 and PL2 in an inspection process. When the corners of the attached polarizer plates PL1 and PL2 are within the polarizer plate fiducial mark M in a square shape, the attachment of the first and second polarizer plates PL1 and PL2 is judged as a good display device.

Figure 5:
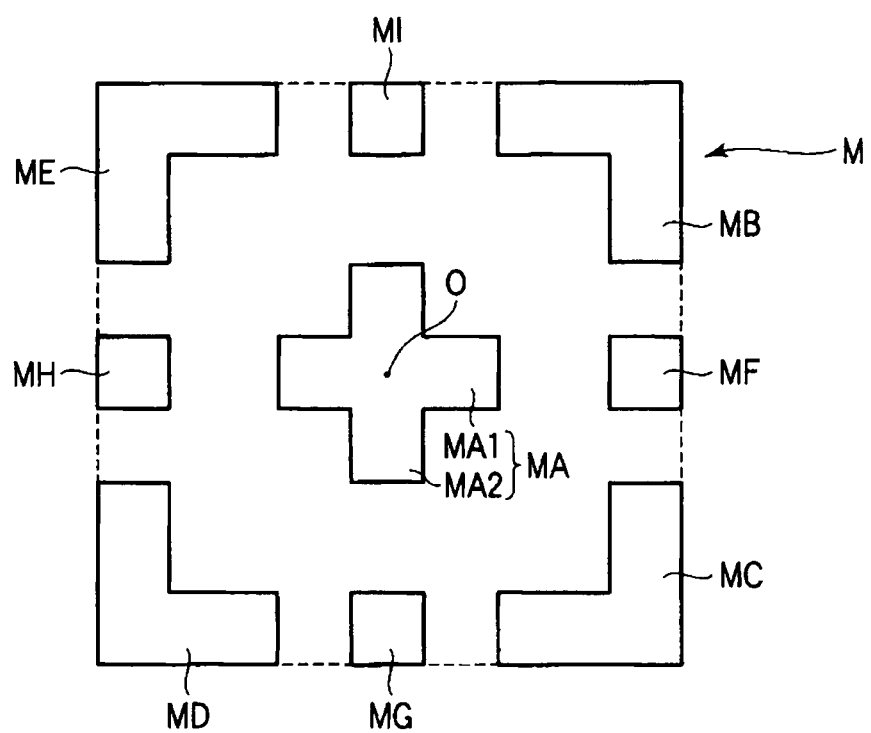
FIG. 5 is a schematic plan view showing a pattern of a polarizer plate fiducial mark formed on the liquid crystal display panel shown in FIG. 4.

Next, the detailed construction of the polarizer plate fiducial mark M will be explained. FIG. 5 is a schematic plan view showing a pattern of the polarizer plate fiducial mark M formed on the common voltage supply region 40 of the counter substrate CT shown in FIG. 4. The polarizer plate fiducial mark M may be formed in a square shape as shown by dotted lines. The polarizer plate fiducial mark M includes a cross shaped mark MA and four L shaped marks MB, MC, MD and ME arranged around the cross shaped mark MA A horizontal mark MA1 and a vertical mark MA2 cross at a center point O. The crossing point O (center point) of the cross shaped mark MA is used to check the alignment of the corner portions of the first and second polarizer plates PL1 and PL2. That is, the first and second polarizer plates PL1 and PL2 are inspected if the respective corner portions of the first and second polarizer plates PL1 and PL2 overlap with the polarizer plate fiducial mark M using the crossing point O as a fiducial point. The respective L shaped marks MB, MC, MD and ME are arranged at the four corners of the polarizer plate fiducial mark M. The respective corner portions of the L shaped marks MB, MC, MD and ME correspond to those of the polarizer plate fiducial mark M.

The size of the polarizer plate fiducial mark M is set corresponding to an acceptable miss-alignment range when the respective corner portions of the first and second polarizer plates PL1 and PL2 shift from the crossing point O. That is, the first and second polarizer plates PL1 and PL2 are arranged so that the respective corner portions are located inside of the polarizer plate fiducial mark M defined by the four L shaped marks MB, MC, MD and ME. Accordingly, when the attached first and second polarizer plates PL1 and PL2 are located outside of the polarizer plate fiducial mark M, the display is judged out of alignment and as a defective display device in the inspection process.

In the polarizer plate fiducial mark M shown in FIG. 5, the polarizer plate fiducial mark M includes four dot marks MF, MG, MH and MI, respectively arranged between adjacent two L shaped marks among the four L shaped marks MB, MC, MD and ME. The dot mark MH is arranged between the L shape marks MD and ME. Similarly, the dot mark MF is arranged between the L shape marks MB and MC. The dot marks MF and MH are arranged in alignment with a lateral mark MA1 of the cross shape mark MA. The dot mark MG is arranged between the L shaped marks MD and MC. Similarly, the dot mark MI is arranged between the L shaped marks MB and ME. The dot marks MI and MG are arranged in alignment with a vertical mark MA2 of the cross shaped mark MA. The dot marks MF, MG, MH and MI result in clearer outline of the square shape.

Figure 6:
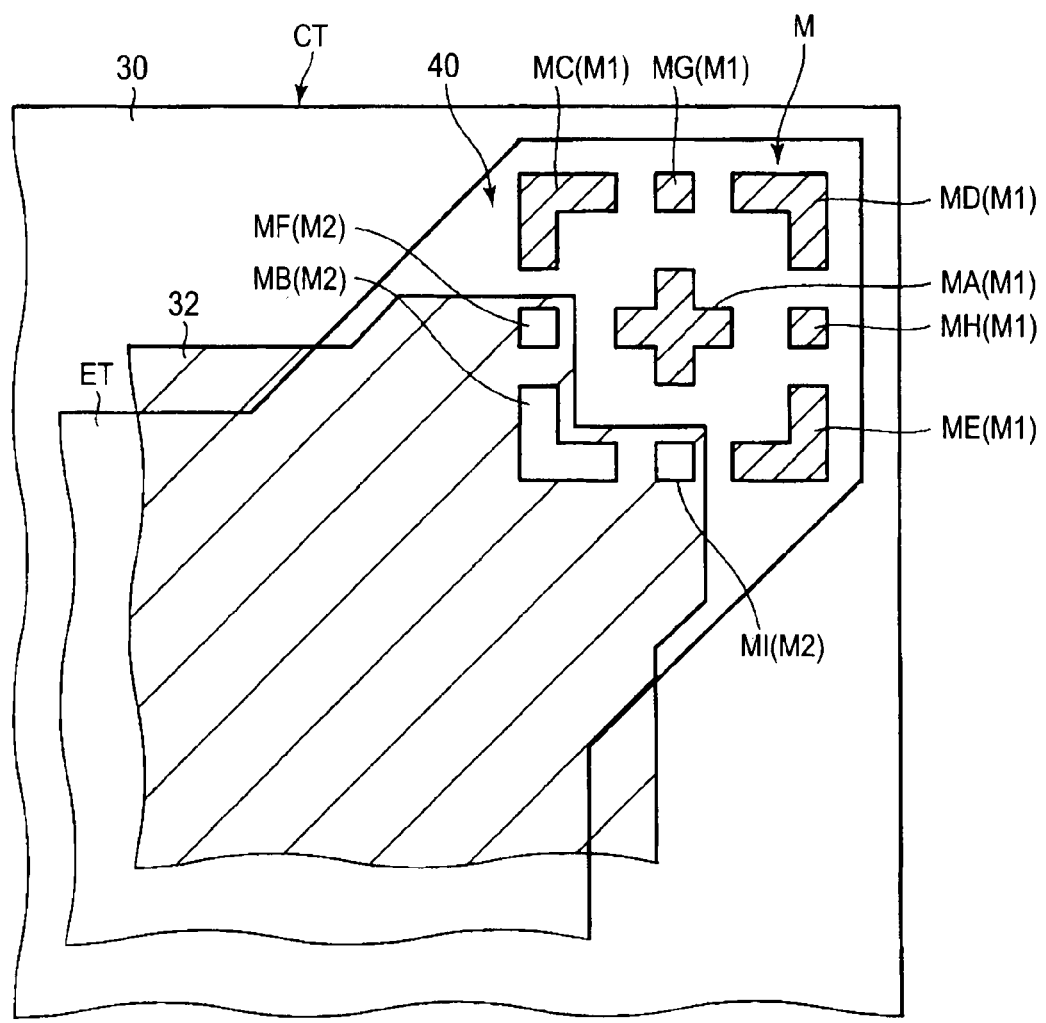
FIG. 6 is a schematic plan view showing a structure to supply common voltage to the counter electrode in which the polarizer plate fiducial mark shown in FIG. 5 is formed on the counter substrate in the liquid crystal display panel according to the first embodiment of the invention.

The cross shaped mark MA, the four L shaped marks MB, MC, MD and ME and the four dot marks MF, MG, MH and MI are formed as the first mark M1 (shield pattern) or the second mark M2 (aperture pattern). FIG. 6 shows one example of the pattern of the common voltage supply region 40 and the polarizer plate fiducial mark M. FIG. 6 is a schematic plan view showing a schematic structure to supply the common voltage to the counter electrode ET formed in the counter substrate CT shown in FIG. 4.

The polarizer plate fiducial mark M is arranged in the power supply region 40 on the insulating substrate 30. The shield layer 32 extends to the power supply region 40. The counter electrode ET is arranged on the shield layer 32 and extends to the power supply region 40. The counter electrode ET is also arranged on the polarizer plate fiducial mark M. In the polarizer plate fiducial mark M, the three L shaped marks MC, MD and ME and the two dot marks MG and MH are formed as the first mark M1 and are apart from the shield layer 32. The first mark M1 is a light shield pattern formed of the same material as the shield layer 32. The L shaped mark MB and dot marks MF and MI are formed as the second mark M2 by partially removing the shield layer 32. The second mark M2 is an aperture pattern which penetrates in the shield layer 32.

According to the present invention, when we check the polarizer plate fiducial pattern M formed of the first and second marks M1 and M2, with eyes, light is shielded by the first mark M1 formed of the shield pattern and light passes in the second mark M2 formed of the aperture pattern. Therefore it is possible to easily recognize the shape of the polarizer plate fiducial mark M. This affords for a easy check of the respective corner portions of the first and second polarizing plates PL1 and PL2 using the cross shaped mark and allows one to recognize the acceptable range of misalignment using the four L shaped marks MB, MC, MD and ME. Utilizing the embodied makes it possible to raise the alignment accuracy to attach when one attach the first and second polarizer plates PL1 and PL2 to the array substrate AR and the counter substrate CT.

According to this embodiment, it becomes easy to judge a properly aligned display device or a defective display device during the inspection process. Under this embodiment, the good display device means at least three corners of the first and second polarizer plates PL1 and PL2 are located inside of the corresponding polarizer plate fiducial mark M. On the other hand, the defect display device means at least two corners of the first and second polarizer plates PL1 and PL2 are located outside of the polarizer plate fiducial mark M.

Figure 7:
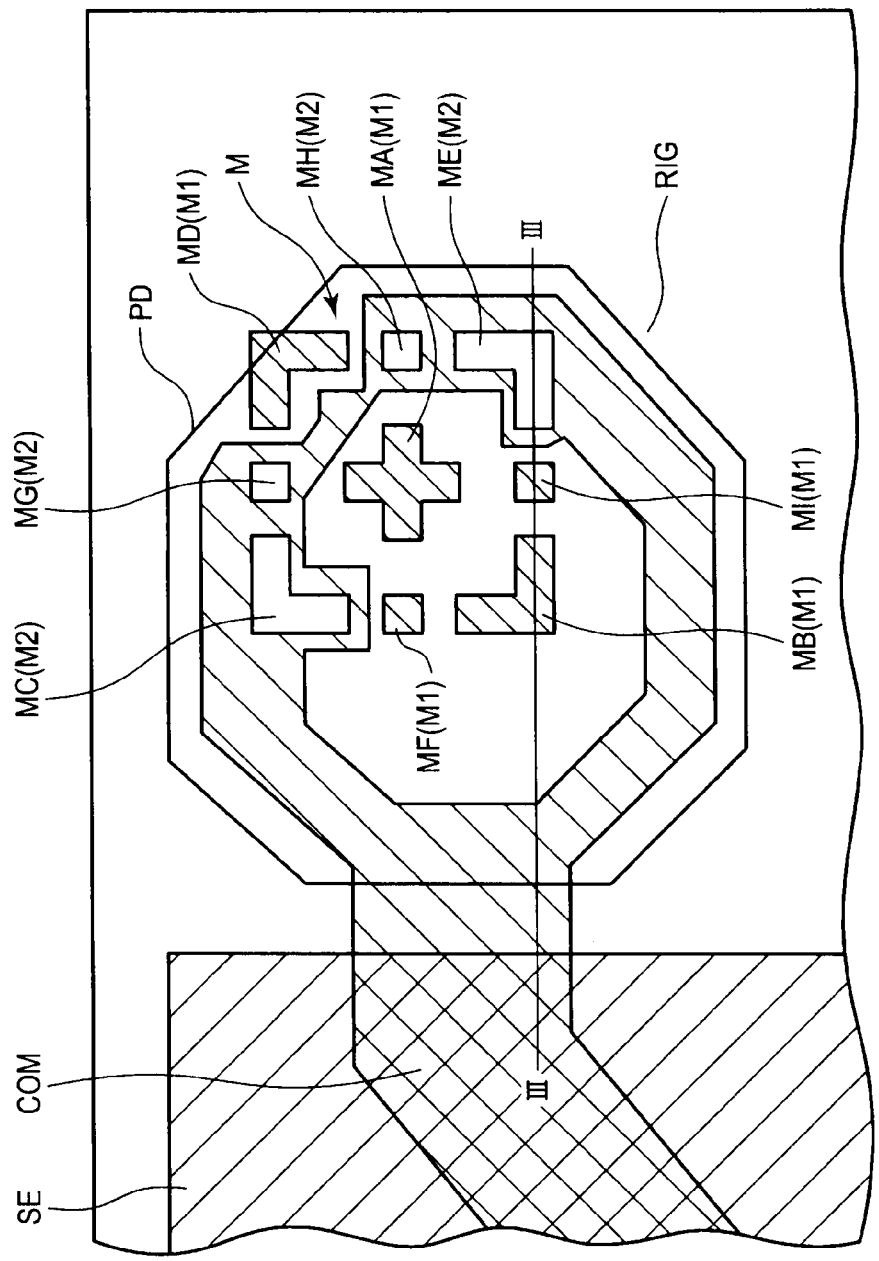
FIG. 7 is a schematic plan view showing a structure to supply common voltage to the counter electrode in which the polarizer plate fiducial mark shown in FIG. 5 is formed on the array substrate in the liquid crystal display panel according to a second embodiment of the invention.

FIG. 7 shows a second embodiment according to the present invention. In the embodiment shown in FIG. 6, the polarizer plate fiducial mark M is formed in the counter substrate CT using a shield layer 32. However, it is possible to form the polarizer plate fiducial mark M on the array substrate AR. In the case, the polarizer plate fiducial mark M is formed using metal wirings such as common voltage supply lines, the gate lines, the gate electrodes or the source lines that shield light. The polarizer plate fiducial mark M includes first and second marks M1 and M2 as well as the first embodiment. In this second embodiment, a common voltage supply layer formed on the array substrate AR is used to form the polarizer plate fiducial mark M. The common voltage supply layer extends from a terminal arranged at an edge portion of the array substrate AR to corner portions to supply the common voltage to the counter electrode ET formed on the counter substrate CT.

The common voltage supply layer includes an octagon shaped end portion RIG arranged at the corners of the array substrate AR. The octagon shaped end portion RIG includes an aperture portion and a ring portion surrounding the aperture portion. The polarizer plate fiducial mark M in a square shape includes a first mark M1 formed in the aperture portion of the octagon shaped end portion RIG on the array substrate AR by the same metal as the common voltage supply layer. The L shaped mark MD is formed at a portion of a peripheral region of the ring portion. The second mark M2 is formed by selectively removing the metal of the ring portion of the octagon shaped end portion RIG in the common voltage supply layer. That is, the second mark M2 is an aperture pattern which passes light.

The two L shaped marks MB and MD and the two dot marks MI and MF are formed as the first mark M1 and are apart from the ring shaped portion of the octagon shaped end portion RIG. The two L shape marks MC and ME and dot marks MG and MH are formed as the second mark M2 by partially removing the metal of the ring portion. A common voltage supply pad PD covers the octagon shaped end portion RIG.

Figure 8:
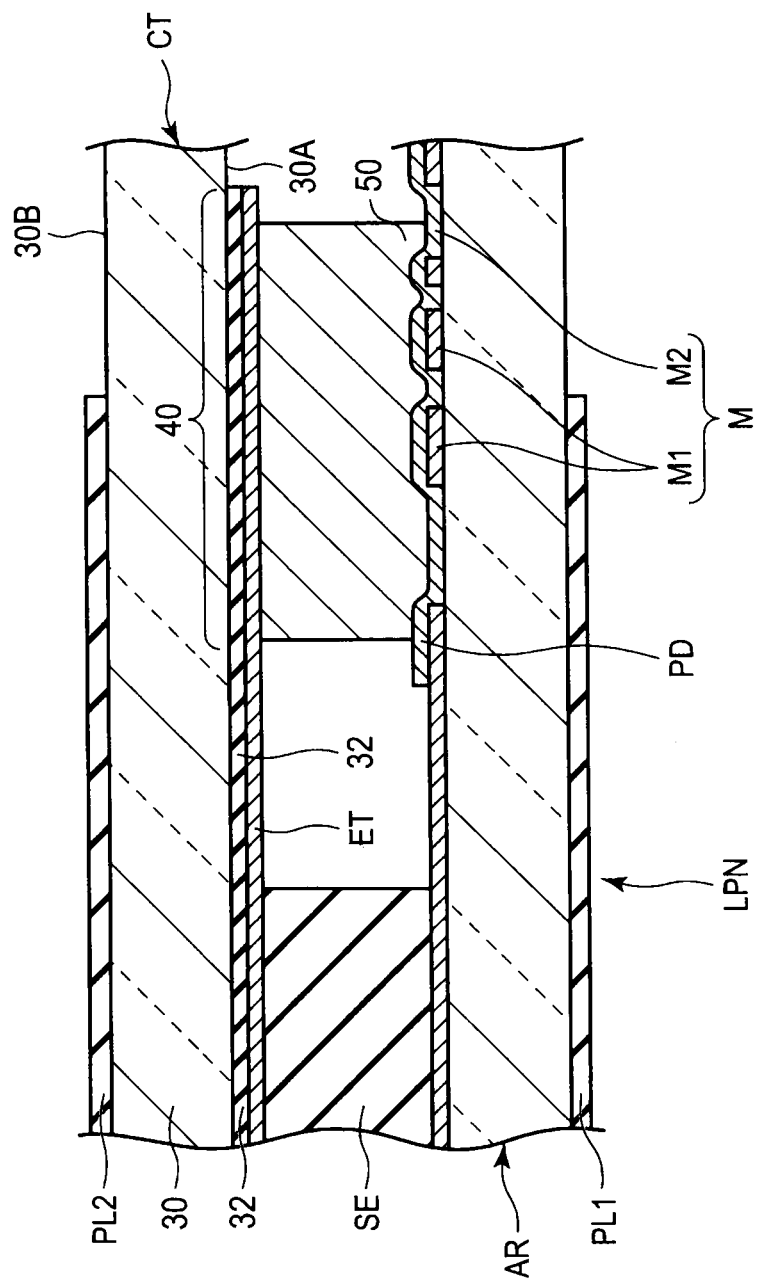
FIG. 8 is a schematic cross-sectional view showing a structure of the second embodiment taken along line III-III shown in FIG. 7 according to the present invention.

FIG. 8 is a cross-sectional view taken along line III-III in FIG. 7. The common voltage supply pad PD is connected to the counter electrode ET formed on the counter substrate CT through a connecting element 50.

As described-above, the present invention can provide a liquid crystal display device capable of easily checking the alignment error to attach the polarizer plates to the array substrate and the counter substrate.

The present invention is applicable to a liquid crystal display device in which a power supply construction to supply common voltage from the array substrate AR to the counter substrate CT is provided and is also applicable to various liquid crystal display modes. In this embodiment, a transmissive mode liquid crystal display panel is adopted, however, a reflective type liquid crystal display panel, in which light is selectively reflected by using reflective conductive material such as aluminum as a pixel electrode, may be adopted.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understand that within the scope of the appended claims, the present invention may be practiced other than as specifically disclosed.

What is claimed is:

1. A liquid crystal display device comprising:
   an array substrate and a counter substrate facing each other and including a liquid crystal layer interposed between inner surfaces of the array substrate and the counter substrate;
   a polarizer plate attached to each of respective outer surfaces opposed to the inner surfaces of the counter substrate and the array substrate;
   an active area formed on the array substrate and the counter substrate to form a plurality of pixels in a matrix;
   a common voltage supply pad formed at a corner of the array substrate;
   a common voltage supply region formed on the counter substrate to supply the common voltage to a counter electrode;
   a conductive element to connect the common voltage supply pad on the array substrate to the counter electrode extending to the common voltage supply region facing the common voltage supply pad;
   a shield layer formed on the counter substrate to surround the active area and extending to the common voltage supply region facing the common voltage supply pad; and
   a polarizer plate fiducial mark formed on the counter substrate to check alignment error of the polarizer plate attached to each of the respective outer surfaces of the array substrate and the counter substrate, the fiducial mark formed by patterning of the material of said shield layer to produce a pattern defined by retained portions of said material of the shield layer and aperture portions where the material of the shield layer has been removed.

2. The liquid crystal display device according to claim 1, wherein the pattern of the polarizer plate fiducial mark defines a cross shaped mark element and L shaped mark elements surrounding the cross shaped mark element.

3. The liquid crystal display device according to claim 2, wherein the L shaped mark elements define a substantially square shape, the cross shaped mark element includes a lateral and horizontal sub-elements orthogonally crossing at a center point, and the respective L shaped mark elements are arranged at corners of the substantially square shape.

4. The liquid crystal display device according to claim 3, wherein the polarizer fiducial mark further includes a dot mark element arranged between a pair of the L shaped mark elements.

5. A method for manufacturing a liquid crystal display device comprising:
   providing an array substrate and a counter substrate facing each other and including a liquid crystal layer interposed between inner surfaces of the array substrate and the counter substrate;
   attaching a polarizer plate to each of respective outer surfaces opposed to the inner surfaces of the counter substrate and the array substrate;
   forming an active area on the array substrate and the counter substrate to form a plurality of pixels in a matrix;
   forming a shield layer to surround the active area on the counter substrate and extending to a corner portion of the counter substrate; and
   forming a polarizer plate fiducial mark on the counter substrate to check alignment error of the polarizer plate attached to each of the respective outer surfaces of the array substrate and the counter substrate, the fiducial mark formed by patterning of the material of said shield layer to produce a pattern defined by retained portions of said material of the shield layer and aperture portions where the material of the shield layer has been removed.

6. The method for manufacturing the liquid crystal display device according to claim 5, further including:
   establishing on the counter substrate a common voltage supply region and forming on the counter substrate a counter electrode extending to the common voltage power supply region;
   forming a common voltage supply pad at a corner of the array substrate;
   connecting the counter electrode to the common voltage supply pad on the array substrate by forming a conductive element to connect the common voltage supply pad on the array substrate to the counter electrode in the common voltage supply region.

7. The method for manufacturing the liquid crystal display device according to claim 5,
   wherein the pattern of the polarizer plate fiducial mark includes a cross shaped mark element and L shaped mark elements surrounding the cross shaped mark element, and
   wherein the L shaped mark elements define a substantially square shape, the cross shaped mark element includes lateral and horizontal mark sub-elements orthogonally crossing at a center point, and the respective L shaped mark elements are arranged at corners of the substantially square shape.

8. The method for manufacturing the liquid crystal display device according to claim 7, further comprising forming a dot mark element between a pair of the L shaped mark elements.

* * * * *